United States Patent Office 3,557,030
Patented Jan. 19, 1971

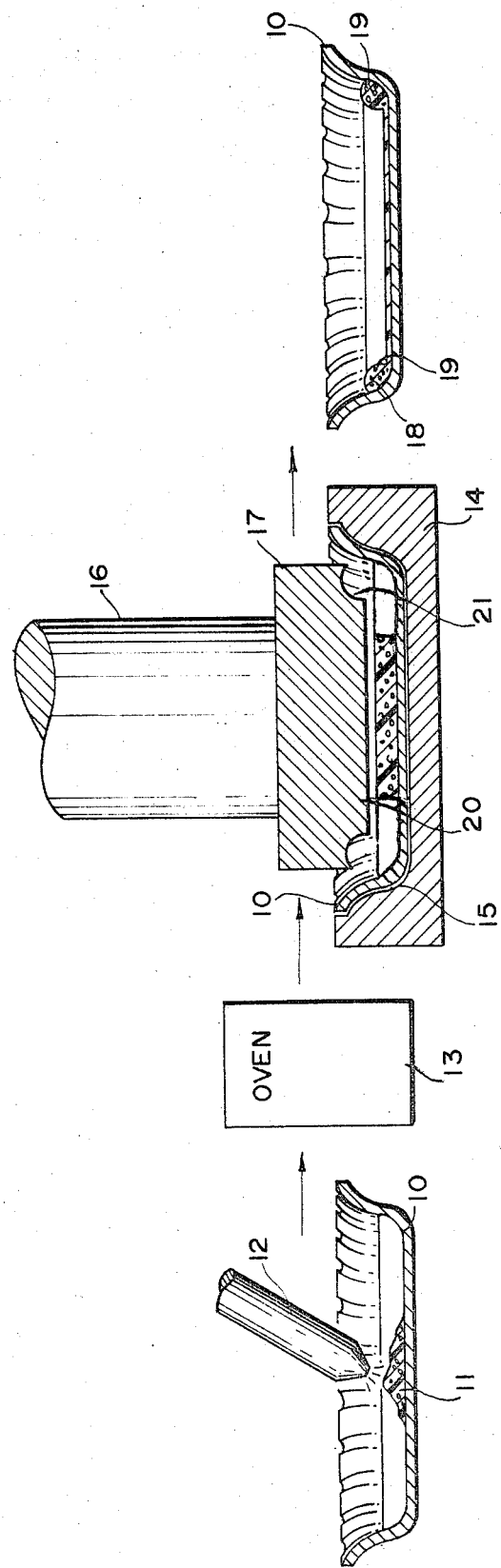

3,557,030
GASKET-FORMING COMPOSITIONS
FOR CLOSURE ELEMENTS
Charles W. Simons, Bedford, Mass., assignor to W. R. Grace & Co., Cambridge, Mass., a corporation of Connecticut
Filed Sept. 15, 1966, Ser. No. 579,691
Int. Cl. C08f 29/18, 45/40
U.S. Cl. 260—17
5 Claims

ABSTRACT OF THE DISCLOSURE

Compositions suitable for use as gaskets in container closure elements consisting of a two-phase system composed of plasticized coarse resin particles dispersed in water. Thickening agents such as water-insoluble materials, e.g., silica gel, or water-soluble materials, e.g., cellulose derivatives, may be included in the compositions.

This invention relates to compositions which are suitable for forming sealing gaskets for container closures.

Vinyl resin plastisols are currently employed to form gaskets in a variety of closures, such as crowns, screw caps, lug caps, etc. to seal containers and preserve the contents thereof. Plastisols are composed essentially of a resin dispersed in a liquid non-volatile plasticizer in which the resin is essentially insoluble at room temperature but is rapidly soluble at an elevated temperature. Gaskets are formed by depositing a predetermined amount of plastisol in a closure and heating the closure containing the plastisol at a temperature between about 325° F. and 425° F. whereby the resin fuses with the plasticizer. Upon cooling, the fused mass forms a coherent rubber-like gasket.

In one method, a gasket is formed by depositing a metered amount of plastisol in the center of an inverted closure shell, such as a crown, and the shell is spun to distribute the plastisol over the panel area. In another method, the deposited plastisol may be distributed and molded to the desired shape by applying a plunger which may or may not be heated.

Vinyl chloride polymers are generally selected as the resin component in plastisols because of their inert characteristics. These polymers are frequently referred to as dispersion or paste grade resins and are prepared by emulsion polymerization whereby a particle size sufficiently small to remain in colloidal suspension is produced. Careful control of particle size is essential to yield resins which will form plasticizer dispersions with optimum rheological properties. The particle size generally ranges between 0.2 and 5 microns.

Emulsion polymerization comprises four ingredients: (1) monomer, vinyl chloride, for example; (2) continuous phase (water); (3) emulsifying agent (soap, for example, sodium dodecyl benzene sulfonate); and (4) initiator (for example, sodium peroxysulfate). In this system, the monomer is emulsified in the water with the aid of the soap and the monomer is present almost entirely as emulsion droplets dispersed in a continuous aqueous phase. When sufficient soap is added to the water, it exists in the form of micelles. Part of a monomer added to the system enters the micelles, but most of it exists in the form of droplets about a micron in diameter stabilized by a portion of the soap. As free radicals are formed, they migrate into the monomer phase where polymerization takes place. As the polymer is formed, the micelles grow by the addition of monomer from the aqueous phase and eventually from the monomer droplets.

When polymerization is complete, the dispersed particles are then dried by spraying the emulsion into a current of hot air. The resulting particles consist of agglomerates which range in size up to 5 microns and are composed of individual spheres having a size of about 0.2 to 0.5 microns. Additional soap may be added prior to spray drying to improve the dispersion characteristics of the dried resins.

The use of highly effective surface-active agents in emulsion polymerization yields a polymer having a high molecular weight and a particle size of less than about five microns. The particle size represents an advantage for use in plastisols because the polymer is easily stirred with the plasticizer to form a uniform mixture. The high molecular weight prevents solvation of the polymer by the plasticizer at room temperature, thus assuring viscosity stability of the plastisol during storage. However, because of the very small particle size a great surface is exposed on which the soap is adsorbed. This is a definite drawback because the soap represents an impurity, and gaskets formed from plastisols containing a polymer derived by emulsion polymerization adversely affect the flavor of certain edible products. Carbonated beverages, for example, are sensitive to flavor deterioration. In addition, the soap impairs the clarity of clear gaskets formed from such plastisols.

It is, therefore, an object of this invention to provide sealing compositions which avoid the drawbacks associated with gaskets formed of polymers containing residual contaminants resulting from emulsion polymerization. This objective is achieved by providing a composition which is substantially immobile at room temperature and consists of a two-phase system comprising plasticized coarse resin particles dispersed in water. The viscosity of the composition is regulated by amount of water employed as the continuous phase in the presence or absence of a thickening agent. Various additives may be included in the composition to impart desirable properties, such as stabilizers, colorants, etc.

Although the sealing composition of this invention includes a plasticized resin, it differs from the generally accepted definition of plastisols. In this invention, a substantial portion of the plasticizer is absorbed by the resin particles, and the plasticized resin together with the unadsorbed plasticizer and some resin particles remain in a dispersed state at room temperature in the aqueous medium until the composition is fused. During fusion the water is driven off and the plasticizer is completely absorbed during the fusion cycle. In a true plastisol, however, the resin is dispersed in the liquid plasticizer at room temperature.

This invention, therefore, permits the use of thermoplastic resins in gasket-forming compositions which are available in granular form but which cannot be used in making plastisols because of the large particle size of the resin. For example, a terpolymer of vinyl chloride, vinyl acetate and maleic anhydride can be used in the aqueous compositions of this invention without difficulty. On the other hand, if this terpolymer were employed in a plastisol it would have poor paste viscosity stability because the terpolymer would be rapidly swollen by the plasticizer. One advantage of using this terpolymer is that it imparts superior adhesion to metals and thus functions as an excellent gasketing material in metal closures. In addition, the resins are generally formed by suspension polymerization techniques which are not dependent on the use of emulsifying agents, and are, therefore, free of emulsifier contamination.

The coarse resins used in this invention are more economical to prepare than the fine resins used in plastisol preparation. They are made by suspension polymerization in which the monomer is suspended as small droplets in a medium (generally water) in the presence of a suspending agent, such as polyvinyl alcohol or magnesium phosphate, and an oil-soluble catalyst, such as benzoyl peroxide. With suitable control, the particle size of the resin ranges between about 20 and 200 microns. On the other hand, the particle size of the resin derived by emulsion polymerization and which is customarily employed in plastisol compositions ranges between about 0.2 and 5 microns with an average particle size of about 1.5 microns.

The single figure of the drawing diagrammatically illustrates the essential steps which are followed to mold gaskets from compositions of this invention.

In preparing the compositions of this invention, the steps may be varied without significantly affecting their final properties. In one method, a master batch is prepared containing sufficient water-miscible thickening agent and water to form a four percent solution which is subsequently diluted with additional water to provide the desired viscosity of the composition. The other ingredients such as plasticizer, stabilizer, etc. are then thoroughly stirred into the solution. Finally the resin is added and is thoroughly mixed with the other ingredients. In an alternate method, the liquid plasticizer may be mixed with the resin and then added to the aqueous system. Irrespective of the manner in which the resin and plasticizer are added, ultimately a substantial portion of the plasticizer is absorbed by the coarse resin particles. The final gasket-forming composition is a slurry which resembles a gritty sand-water mixture in which the resin particles containing the absorbed plasticizer, the unabsorbed plasticizer, small amounts of resin particles, other solid additives, and all hydrophobic liquids represent the discontinuous phase. The water together with a water-soluble thickening agent define the continuous phase. The viscosity ranges between about 500 and 40,000 centipoises, as measured on a Severs Rheometer, Model A-120 under the following conditions:

Length of orifice—5 cm.
Radius of orifice—0.1564 cm.
Efflux time—5 seconds
Applied gas pressure—5 to 150 p.s.i.

The compositions of this invention are well suited for molding gaskets in closures by means of a shaping die. In a molding operation as illustrated in the drawing, a predetermined amount of composition 11 is delivered from a suitable source, such as a dispensing nozzle 12, and placed in the center portion of the crown 10. The crown containing the composition is then moved to a heating chamber, such as oven 13, in which air heated to a temperature ranging between about 325° F. and 425° F. is circulated. As the composition is heated, the water is volatilized, and continued heating to higher temperatures causes fusion of the resin and plasticizer. The crown containing the fused mass is then delivered to a molding station where it is shaped into a gasket. The molding station includes a platen 14 having a groove 15 arranged below a shaping member comprised of a shank 16 and a die 17. Either or both the platen and the shaping member may be cold or heated (by means not shown) below the fluxing temperature of the composition. Subsequently, the closure is cooled whereupon the gasket is solidified to a coherent mass.

In preparing the gasketed closure, a sheet of metal plate, such as tinplate, aluminum or aluminum alloy, is provided. Since metallic contamination has the most drastic action on palatability of edible products, such as carbonated beverages, the metal surface is first coated with a lacquer or enamel to protect the contents in the container against such contamination. When the gasket is formed of a composition which includes a vinyl chloride resin, it is usual to coat the metal with a compatible vinyl lacquer to assure adhesion of the gaskets to the coating. The coating may be one which is derived from a lacquer containing a vinyl resin alone or in combination with one or more of oleoresinous, epoxy, acrylic or phenolic components. A satisfactory coating composition is one derived from polyvinyl chloride or a major amount of vinyl chloride copolymerized with up to about 20% by weight of vinyl acetate in combination with the aforementioned components.

Vinyl resins are particularly suitable for use in the sealing compositions of this invention. These include coarse homopolymers of vinyl chloride and copolymers of vinyl chloride with up to 20% by weight of another monomer copolymerizable therewith. Suitable monomers include acrylonitrile, vinylidene chloride, vinyl acetate, and dialkyl maleates. Typical copolymers include 95 percent vinyl chloride-5% vinyl acetate; 95 percent vinyl chloride-5% dialkyl maleate; and 94 percent vinyl chloride-6% vinylidene chloride. The preferred resin is polyvinyl chloride. These polymers are prepared by suspension polymerization and are substantially free of emulsifying agents.

The plasticizer must be capable of dissolving the resin when heated, and it must remain completely compatible with it upon cooling. Illustrative plasticizers include dialkyl phthalates, alkyl phthalyl alkyl glycolates, dialkyl esters of alkane dicarboxylic acids, acetyl trialkyl citrates, and trialkyl and triaryl phosphates. Particular plasticizers include dioctyl phthalate (di-2-ethylhexyl phthalate), octyl decyl phthalate, ethyl phthalyl ethyl glycolate, butyl phthalyl butyl glycolate, diisobutyl adipate, dibutyl sebacate, acetyl dibutyl citrate, trioctyl phosphate and tricresyl phosphate. Other useful plasticizers include alkyl esters of fatty acids, such as octyl stearate; epoxidized triglycerides, such as epoxidized soybean oil; and polymeric polyester plasticizers, such as polymeric glycol adipate. The amount of plasticizer in the composition ranges between about 20 and 250 parts, preferably 20 to 150 parts by weight per hundred parts by weight of resin.

The type and amount of thickening agent influence the viscosity and flow characteristics of the composition. If the viscosity is too low, it may create settling problems during storage, and if it is too high it may not be satisfactorily metered into closures through dispensing nozzles. Therefore, by judicious selection of the thickening agent and the quantity employed, a composition is obtained which is a gritty paste having limited radial mobility and which remains substantially in place when deposited in the center of an inverted closure, but which is easily distributed over the panel during the molding step. The amount of thickening agent which achieves these results ranges between about 0.03 and 10 parts by weight per hundred parts by weight of resin.

Satisfactory thickening agents include materials which are insoluble in water, such as finely divided silica gel, fuller's earth, activated clay, activated alumina and similar absorbents which take up liquids on their surface. The preferred thickeners are those which are water-soluble at room temperature as these agents contribute to the continuous phase of the compositions and enable thorough and uniform mixing of the solid ingredients. Illustrative agents are cellulose derivatives, such as alkali metal salts of carboxymethyl cellulose, for example, sodium carboxymethyl cellulose and potassium carboxymethyl cellulose; methyl cellulose; hydroxymethyl cellulose; hydroxy propyl cellulose, and mixtures of such cellulose derivatives. Other agents include ethylene oxide polymers.

The thickening agent may be excluded from the composition provided that the composition is maintained in a circulated condition and is used immediately to form gaskets. If the agent is omitted and the composition is not circulated, settling of the components will occur with the result that the gaskets will lack uniform properties.

The composition may also include a solid decomposable chemical blowing agent to provide the gasket with a cellular structure in the annular region 18 which contacts the lip of a container. During the fluxing cycle, the blowing agent decomposes and releases a gas whereby cells 19 are formed in the mass. The particular gasket design may be achieved by using a die 17 having a flat or convex center portion 20 on its face and a pheripheral channel 21. During the molding step, the die will compress the cells which form in the center of the gasket while preserving the cellular structure in the annular area by means of the peripheral channel. Suitable blowing agents include azodicarbonamide, 3,3′-disulphonhydrazido diphenylsulfone, dinitrosopentamethylene tetramine, diazoaminobenzene, and p,p′-oxybis (benzene sulfonyl hydrazide). The amount of blowing agent which will provide the desired cellular structure ranges between about 0.2% and 5.0% based on the weight of the resin.

Various other additives may be included to modify the compositions. These include fillers, such as anhydrous calcium sulfate, talc, wood flour and asbestos; stabilizers, such as tetrasodium pyrophosphate, tribasic lead silicate, calcium stearate, zinc stearate, dibasic lead stearate and organotin complexes; and pigments, such as carbon black, titanium dioxide and alumina powder. Small amounts of emulsifier of the order of less than 2% based on the weight of the resin may be added to aid in dispersing the free plasticizer.

The invention is further illustrated by the following examples:

EXAMPLE 1

A sealing composition was prepared which included the following ingredients:

| Ingredient: | Parts by wt. |
|---|---|
| Polyvinyl chloride (Geon 103 EP)[1] | 100 |
| Hydroxy propyl cellulose (thickening agent) | 1 |
| Dioctyl phthalate (plasticizer) | 96 |
| Epoxidized soya bean oil (plasticizer) | 10 |
| Mixed calcium and zinc stearates (stabilizer) | 1 |
| Water | 65 |

[1] Suspension grade resin having a particle size of less than 10% ranging between 75 and 130 microns and less than 90% ranging between 130 and 200 microns, all particles passing through a 42-mesh screen (Tyler Standard Scale).

The composition was prepared by first dissolving the hydroxyl propyl cellulose in the water and thereafter incorporating the plasticizers and stabilizer. The polyvinyl chloride was finally added to the system while thoroughly agitating the same. The result was a viscous fluid having the consistency of wet sand.

330 milligrams of the composition were deposited in the center of a crown closure and the closure containing the composition was then passed to an oven in which air heated at 400° F. was circulated. The residence time in the oven was 133 seconds at which time the water was driven off and the composition was fluxed. The fluxed composition exhibited little or no radial movement. A gasket was then molded over the panel of the closure using a die having a temperature of 78° F. and a platen having a temperature of 320° F. The die pressure was 80 p.s.i., and the molding cycle was completed within 4 seconds. The result was a coherent gasket which adhered well to the closure.

EXAMPLE 2

A composition was prepared in the same manner as described under Example 1 and was comopsed of the following ingredients:

| Ingredient: | Parts by wt. |
|---|---|
| Geon 103 EP | 100 |
| Hydroxy propyl cellulose | 1 |
| Epoxidized soya bean oil | 240 |
| Mixed calcium and zinc stearates | 1 |
| Water | 65 |

330 milligrams of the composition were placed in a crown closure and then moved to an oven in which air heated to 400° F. was circulated. The residence period was one minute during which time the water was driven off and the composition was fluxed. The fluxed composition was then molded in the crown with a die having a temperature of 75° F. and a platen temperature of 75° F. The gasket was completely molded within four seconds, and it was of acceptable quality.

EXAMPLE 3

In another embodiment, the sealing composition of this invention was prepared as described in Example 1. It was composed of the following ingredients:

| Ingredient: | Parts by wt. |
|---|---|
| Polyvinyl chloride (Escambia 2225)[1] (Suspension grade resin) | 100 |
| Di(n-hexyl) azelate | 60 |
| Dibutyl tin dilaurate | 5 |
| Sodium lauryl sulfate (35% solution in water) | 6 |
| Ethylene oxide polymer, molecular weight about 600,000, 10% solution in water (thickening agent) | 20 |
| Water | 35 |

[1] Particle size (U.S. Standard Scale).

| Mesh No. | Percent retained |
|---|---|
| 45 | 2 |
| 50 | 6 |
| 60 | 36 |
| 80 | 40 |
| 200 | 16 |

320 milligrams of the composition were placed in a crown and heated in an air stream for two minutes at 420° F. The resulting fluxed composition was then molded for four seconds using a die and platen, each having a temperature of 75° F. The gasket was clear and conformed to the inside surface of the crown covering the panel area.

EXAMPLE 4

The following example shows that satisfactory sealing compositions can be prepared using plasticizers which are unsuitable in plastisol formulations. Experience in plastisol formulations showed that 50 parts per hundred parts of resin of the plasticizer employed in this composition yielded plastisols which were very viscous and completely unusable. In addition, when the plasticizer content was increased to 100 parts by weight of resin a heavy sticky plastisol resulted. A satisfactory composition, however, was prepared according to the procedure described in Example 1 and was composed of the following ingredients:

| Ingredient: | Parts by wt. |
|---|---|
| Geon 103 EP | 100 |
| Paraplex G25 (polyester type plasticizer) | 50 |
| Emcol 14 (polyglycerol oleate) (wetting agent) | 1 |
| Hydroxy propyl cellulose | 2 |
| Water | 108 |

To facilitate mixing, the composition was heated to about 120° F. before the resin was stirred in. Although the final mixture was quite thick, it could be distributed through conventional dispensing equipment. 350 milligrams of the composition were deposited in a crown and heated at 420° F. for four minutes. An acceptable gasket was formed in place using a cold (room temperature) die and a platen heated at 200° F.

EXAMPLE 5

This example illustrates formation of an annular gasket in a 48-millimeter continuous thread cap. The composition was prepared according to the procedure described in Example 1 and was composed of the following:

| Ingredient: | Parts by wt. |
|---|---|
| Geon 103 EP | 100 |
| Hydroxy propyl cellulose | 1 |
| Dioctyl phthalate | 69 |
| Epoxidized soya bean oil | 21 |

| Ingredient: | Parts by wt. |
|---|---|
| Mixed calcium and zinc stearates | 1 |
| Water | 65 |

A ring of the composition was deposited in the annulus of the threaded cap which was internally coated with a vinyl lacquer. The cap containing the annular deposit was heated in an oven at 430° F. for 1½ minutes and then molded with a cold die designed to compress the ring. The result was an acceptable well-adhered gasket.

The gasket-forming procedure was varied in a further embodiment by employing the composition of Example 5 but omitting the molding step. Upon fluxing, a slightly cellular gasket resulted which adhered well to the protective lacquer coating. This type of gasket is useful when sealing at low application torques is required.

EXAMPLE 6

This example illustrates the use of low amounts of plasticizer to produce acceptable gaskets. It was prepared in the manner described under Example 1 and was composed of the following ingredients:

| Ingredient: | Parts by wt. |
|---|---|
| Geon 103 EP | 100 |
| Hydroxy propyl cellulose | 1 |
| Epoxidized soya bean oil (plasticizer) | 10 |
| Octyl diphenyl phosphate (plasticizer) | 20 |
| Mixed calcium and zinc stearates | 1 |
| Water | 65 |

The following conditions were employed to form a gasket in a crown using 330 milligrams of composition:

Fluxing conditions

Air stream temperature—400° F.
Residence time in air stream—180 seconds

Molding conditions

Molding die temperature—220° F.
Platen temperature—320° F.
Molding pressure—80 p.s.i.
Molding time—4 seconds While the gasket was slightly discolored due to inadequate stabilization, the molding step was accomplished satisfactorily.

Coarse resins produced by suspension polymerization have a high surface area and absorb a large volume of plasticizer quite readily. These resins permit a fast processing cycle. A distinct advantage of using such resins in sealing compositions of this invention is that processing of the composition is reduced so that the possibility of polymer degradation is minimized considerably.

I claim:
1. A sealing composition consisting essentially of a vinyl chloride resin, having a particle size ranging between about 20 and 200 microns, between about 20 and 250 parts by weight of a plasticizer per 100 parts of resin, between about 0.03 and 10 parts by weight per 100 parts by weight of resin of a thickening agent selected from the group consisting of alkali metal salts of carboxy methyl cellulose, methyl cellulose, hydroxymethyl cellulose, hydroxypropyl cellulose, and mixtures thereof, and ethylene oxide polymers, and between about 30 and 600 parts by weight of water per 100 parts by weight of resin, said composition being immobile at room temperature.

2. A composition according to claim 1 wherein the thickening agent is hydroxyl propyl cellulose.

3. A composition according to claim 2 wherein the resin is polyvinyl chloride.

4. A composition according to claim 1 wherein the viscosity ranges between about 500 and 40,000 centipoises.

5. A composition according to claim 1 which includes a thermally-decomposable solid chemical blowing agent.

References Cited

UNITED STATES PATENTS

| 3,179,646 | 4/1965 | Ingraham | 260—92.8 |
|---|---|---|---|
| 3,318,825 | 5/1967 | Enk et al. | 260—8 |
| 3,226,350 | 12/1965 | Smith et al. | 260—29.6 |
| 2,689,836 | 9/1954 | Bier | 260—30.6 |
| 2,966,470 | 12/1960 | Maltenfort | 260—2.5 |
| 3,029,765 | 4/1962 | Navikas | 113—80 |
| 3,183,284 | 5/1965 | Haberlin | 264—268X |
| 3,265,785 | 8/1966 | Rainer | 264—45 |

FOREIGN PATENTS

| 940,546 | 10/1963 | Great Britain | 260—17UX |

OTHER REFERENCES

Modern Plastics Encyclopedia 1965, p. 271.

WILLIAM SHORT, Primary Examiner
EARL A. NIELSEN, Assistant Examiner

U.S. Cl. X.R.
260—23, 29.6, 30.6, 31.8; 264—268